(12) United States Patent
Branco et al.

(10) Patent No.: US 11,586,560 B2
(45) Date of Patent: *Feb. 21, 2023

(54) SECURE MEMORY

(71) Applicant: Intel Corporation, Santa Clara, CA (US)

(72) Inventors: Rodrigo R. Branco, Hillsboro, OR (US); Shay Gueron, Haifa (IL)

(73) Assignee: INTEL CORPORATION, Santa Clara, CA (US)

(*) Notice: Subject to any disclaimer, the term of this patent is extended or adjusted under 35 U.S.C. 154(b) by 24 days.

This patent is subject to a terminal disclaimer.

(21) Appl. No.: 17/165,361

(22) Filed: Feb. 2, 2021

(65) Prior Publication Data
US 2021/0182217 A1 Jun. 17, 2021

Related U.S. Application Data

(63) Continuation of application No. 16/520,940, filed on Jul. 24, 2019, now Pat. No. 10,922,243, which is a
(Continued)

(51) Int. Cl.
*G06F 12/14* (2006.01)
*H04L 9/06* (2006.01)
(Continued)

(52) U.S. Cl.
CPC ...... *G06F 12/1408* (2013.01); *G06F 11/1048* (2013.01); *G06F 21/78* (2013.01);
(Continued)

(58) Field of Classification Search
CPC .. G06F 12/1408; G06F 11/1048; G06F 21/78; G06F 7/588; G06F 2212/1052;
(Continued)

(56) References Cited

U.S. PATENT DOCUMENTS 5,995,623 A 11/1999 Kawano et al.
6,801,625 B1 10/2004 Dealy
(Continued)

OTHER PUBLICATIONS

"U.S. Appl. No. 15/391,229, Non Final Office Action dated Aug. 27, 2018", 7 pgs.
(Continued)

*Primary Examiner* — Hosuk Song
(74) *Attorney, Agent, or Firm* — Jaffery Watson Mendonsa & Hamilton LLP

(57) ABSTRACT

Various examples are directed to systems and methods for securing a data storage device. A storage controller may receive a read request directed to the data storage device. The read request may comprise address data indicating a first address of a first storage location at the data storage device. The storage controller may request from the data storage device a first encrypted data unit stored at the first memory element and a first encrypted set of parity bits, such as Error Correction Code (ECC) bits, associated with the first storage location. An encryption system may decrypt the first encrypted set of parity bits to generate a first set of parity bits based at least in part on an a first location parity key for the first address.

20 Claims, 9 Drawing Sheets

Related U.S. Application Data continuation of application No. 15/391,229, filed on Dec. 27, 2016, now Pat. No. 10,372,625.

(51) Int. Cl.
   *G06F 11/10* (2006.01)
   *G06F 21/78* (2013.01)
   *G06F 7/58* (2006.01)

(52) U.S. Cl.
   CPC .......... *H04L 9/0618* (2013.01); *H04L 9/0662* (2013.01); *G06F 7/588* (2013.01); *G06F 2212/1052* (2013.01); *G06F 2212/402* (2013.01); *G06F 2212/403* (2013.01); *H04L 2209/34* (2013.01)

(58) Field of Classification Search
   CPC .......... G06F 2212/52; G06F 2212/402; G06F 2212/403; H04L 9/0618; H04L 9/0662; H04L 2209/34
   See application file for complete search history.

(56) References Cited

U.S. PATENT DOCUMENTS

| | | | |
|---|---|---|---|
| 6,820,203 B1 | 11/2004 | Okaue et al. | |
| 6,980,498 B2 | 12/2005 | Sako | |
| 7,124,436 B2 | 10/2006 | Okaue et al. | |
| 7,243,193 B2 | 7/2007 | Walmsley | |
| 7,996,742 B2 | 8/2011 | Janke et al. | |
| 8,316,277 B2* | 11/2012 | Flynn | G06F 11/1048 714/763 |
| 8,521,955 B2 | 8/2013 | Arulambalam et al. | |
| 9,152,576 B2* | 10/2015 | Debout | G06F 3/0644 |
| 9,176,897 B2 | 11/2015 | Kurimoto et al. | |
| 9,471,799 B2 | 10/2016 | Schiffman et al. | |
| 9,720,612 B2 | 8/2017 | Tuers et al. | |
| 10,209,904 B2* | 2/2019 | Himelstein | G06F 11/1451 |
| 10,372,625 B2 | 8/2019 | Branco et al. | |
| 10,761,928 B2* | 9/2020 | Deutsch | G06F 11/1064 |
| 10,922,243 B2 | 2/2021 | Branco et al. | |
| 11,301,172 B2* | 4/2022 | Norman | G06F 3/0659 |
| 2009/0150744 A1* | 6/2009 | Flynn | G06F 9/52 714/752 |
| 2017/0180116 A1 | 6/2017 | Yap et al. | |
| 2018/0181499 A1 | 6/2018 | Branco et al. | |
| 2019/0347214 A1 | 11/2019 | Branco et al. | |

OTHER PUBLICATIONS

"U.S. Appl. No. 15/391,229, Notice of Allowance dated Mar. 26, 2019", 6 pgs.

"U.S. Appl. No. 15/391,229, Respone filed Feb. 27, 2019 to Non Final Office Action dated Aug. 27, 2019", 10 pgs.

"U.S. Appl. No. 16/520,940, Non Final Office Action dated Jun. 22, 2020", 8 pgs.

"U.S. Appl. No. 16/520,940, Notice of Allowance dated Oct. 13, 2020", 7 pgs.

"U.S. Appl. No. 16/520,940, Response filed Sep. 8, 2020 to Non Final Office Action dated Jun. 22, 2020", 8 pgs.

"Intel Software Guard Extensions Intel SGX", Intel Software, (Accessed on Dec. 4, 2017), 4 pgs.

Branco, Rodrigo, et al., "Blinded random corruption attacks", 2016 IEEE International Symposium on Hardware Oriented Security and Trust (HOST), (2016), 85-90.

Gilboa, Shoni, et al., "Distinguishing a truncated random permutation from a random function", arXiv:1508.00462v1 [math.PR], (Jul. 29, 2015), 17 pgs.

Gueron, Shay, "Intel Software Guard Extensions (Intel SGX) Memory Encryption Engine (MEE)", Real World Cryptography Conference 2016 Jan. 6-8, 2016, Stanford, CA, USA, (Jan. 2016), 27 pgs.

Kaplan, David, et al., "AMD Memory Encryption", Advanced Micro Devices, Inc. All rights reserved. White Paper, (Apr. 21, 2016), 12 pgs.

\* cited by examiner

SECURE MEMORY

PRIORITY

This application is a continuation of U.S. application Ser. No. 16/520,940, filed Jul. 24, 2019, which is a continuation of U.S. application Ser. No. 15/391,229, filed Dec. 27, 2016, which is incorporated by reference herein in its entirety.

TECHNICAL FIELD

Examples described herein generally relate to systems and methods for securing computer memory from unauthorized access.

BACKGROUND

Many computing devices are configured and/or programmed to use various security techniques to protect the devices and the data they contain from unauthorized access or control. For example, some computing devices encrypt all or a part of the data stored at disk drives and other non-volatile storage devices. Even when non-volatile drives are encrypted, however, computing devices may still be vulnerable to attacks on system memory.

BRIEF DESCRIPTION OF THE DRAWINGS

In the drawings, which are not necessarily drawn to scale, like numerals may describe similar components in different views. Like numerals having different letter suffixes may represent different instances of similar components. Some examples are illustrated by way of example, and not limitation, in the figures of the accompanying drawings in which.

DETAILED DESCRIPTION

Figure 1:
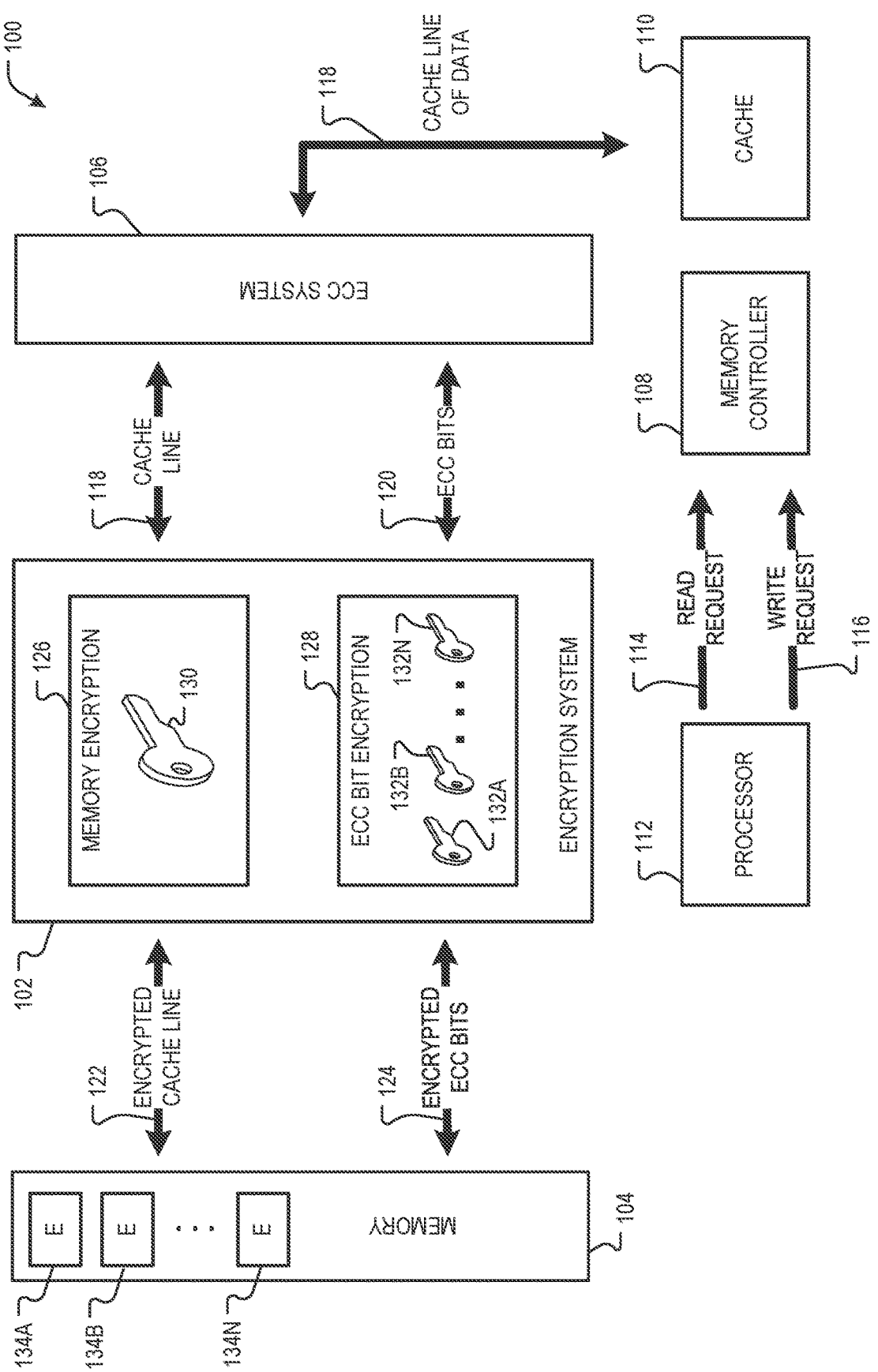
FIG. 1 is a diagram showing one example of an environment for implementing memory encryption.

In the following description, for purposes of explanation, numerous specific details are set forth in order to provide a thorough understanding of some examples. It will be evident, however, to one skilled in the art that the present disclosure may be practiced without these specific details.

Various examples described here are directed to systems and methods for securing computing device memory by encrypting Error Correction Code (ECC) bits for data units stored at a memory device, for example, in conjunction with partial or total memory encryption. For example, encrypted ECC bits associated with encrypted memory may provide an integrity check to the memory encryption, as described herein. Utilizing encrypted ECC bits in this way may make the encrypted memory more secure.

Partial or total memory encryption may be used to protect a computing device against cold boot attacks and other types of attacks that access system memory to defeat disk encryption. For example, even if a disk or other non-volatile storage device is encrypted, the computing device may still store clear data and/or keys for decrypting the disk in system memory. Accordingly, an attacker who can access system memory may be able to defeat disk encryption by accessing the clear data and/or keys that enable decryption of the data on the disk.

Partial or total memory encryption provides additional protection by encrypting some or all of the data units stored at system memory. In this way, to access protected data, an attacker may need to not only access the system memory but must also break the memory encryption. Even total memory encryption, however, may be vulnerable. For example, in a blinded random corruption attack, an attacker gains access to an encrypted system memory by blindly modifying encrypted data stored at the memory.

It may be possible to protect against blinded random corruption attacks and similar attacks using integrity mechanisms. An integrity mechanism may enable a computing device to detect when encrypted data has been modified. Accordingly, when an attacker blindly modifies encrypted data, the computing device may detect the modification and prevent it from affecting the operation of the system.

Integrity mechanisms may be implemented in various ways. In some examples, an operating system of the computing device computes an integrity tag for each data unit of data transferred to system memory. The integrity tag may be a hash or other encoding of the data unit. In addition to writing the data unit to memory, the operating system also writes the integrity tag. When a data unit is received from system memory, it may be compared to the integrity tag. If the data unit has been corrupted, the comparison may fail. This technique, however, may require a specially-programmed operating system. Also, integrity tags generated by an operating system in this manner may occupy system memory capacity that could otherwise be used to store user data.

Some examples described herein utilize ECC bits to provide integrity checking for memory encryption. ECC bits are used in some computing devices to detect and/or correct data corruption. For example, some memory devices, such as Dynamic Random Access Memory (DRAM) devices are susceptible to data corruption during ordinary use. ECC bits for a data unit are found by determining a Hamming code or other suitable code of the data unit. ECC bits for a data unit are calculated when the data unit is written to a memory device. The ECC bits are then stored until the data unit is to be read. For example, memory devices that support ECC may include additional storage associated with each memory cell for storing the ECC bits. When the data unit is read, ECC bits may again be calculated from the read data. If the ECC bits calculated at write-time do not match the ECC bits calculated at read-time, then the computing device may determine that data corruption has occurred. If the corruption affects less than a threshold number of bits, then the ECC bits may be used to re-create the original, uncorrupted data unit. ECC techniques may be implemented by a memory device, by a memory device in conjunction with a processor or other chipset component, or by software.

In examples where ECC is used in conjunction with memory encryption, such as total memory encryption, ECC may provide an additional obstacle to an attacker. For example, an attacker making a blinded random corruption attack, or other attack that involves blindly modifying encrypted memory data, may need to ensure that modified data written to system memory is consistent with stored ECC bits and/or update the ECC bits to conform to the modified data. If this is not done, the computing device may encounter an ECC error when the modified data is read, which may thwart the attack by preventing the modified data from being processed by the computing device. If the ECC bits are encrypted, as described herein, it may be more difficult for the attacker to modify data and/or ECC bits in a way that maintains consistency between the two.

Some examples may be implemented in other types of data storage, such as persistent data storage. For example, some persistent data storage devices utilize location-specific parity bits that may be encrypted to provide integrity in a manner similar to that described herein for ECC bits of a memory. Parity bits may include any type of bit or bits utilized to detect and/or correct errors in data stored at a data storage location. Examples of parity bits include ECC bits, cyclic redundancy check (CRC) bits, bits for checking even/odd parity, etc. For example, in persistent data storage devices, location-specific parity bits may be encrypted with location-specific parity keys similar to what is described herein for ECC bits.

FIG. 1 is a diagram showing one example of an environment 100 for implementing memory encryption. The environment 100 includes an encryption system 102, a memory 104, an ECC system 106, and a memory controller 108. The components 102, 104, 106, 108 may be implemented as or using any suitable computing hardware. The environment 100 also includes an example processor 112 and cache 110. In some examples, the cache 110 is part of the processor 112. For example, the cache 110 and processor 112 may be formed on a common die. Also, in some examples, cache 110 may be omitted and data units may be loaded from the memory 104 to one or more registers of the processor 112. In various examples, some or all of the components of the environment 100 may be in communication with one another via various data and/or address busses.

The memory 104 may be or include any suitable type of memory such as DRAM memory, Synchronous DRAM (SDRAM) memory, non-volatile random access memory (NVRAM), etc. In the example described herein, the memory 104 comprises various memory elements 134A, 134B, 134N. The memory elements 134A, 134B, 134N may be data storage locations that each store one data unit (e.g., one cache line). A cache line, sometimes referred to simply as a line, may be a data unit of data with a set number of bits recognizable to the processor 112. For example, some processors 112, memory devices, 104, etc., may utilize cache lines that are 512 bits in length, although any other suitable cache line length may be used. Cache lines may be transferred between the memory 104 and cache 110, or may bypass cache 110 and be transferred between the memory 104 and the processor 112 and/or another suitable component.

In the example environment 100, the encryption system 102 comprises a memory encryption system 126 and an ECC bit encryption system 128. The memory encryption system 126 may encrypt and decrypt cache lines stored at the memory elements 134A, 134B, 134N of the memory 104. The ECC bit encryption system 128 may encrypt and decrypt ECC bits associated with the cache lines, for example, as described herein. In some examples, the encryption system 102 may omit the memory encryption system 126. For example, memory encryption may be omitted altogether or implemented by another component.

In the example shown in FIG. 1, the processor 112 may provide a write request 116 to the memory controller 108. The write request 116 may include a cache line 118 to be written to a memory element 134A, 134B, 134N of the memory 104 and an address of the memory element to which the cache line 118 is to be written. In some examples, instead of (or in addition to) including the cache line, the write request 116 may reference a location at the cache 110 where the cache line 118 may be located.

The cache line 118 may be provided to the ECC system 106. The ECC system 106 may generate a set of ECC bits 120 for the cache line 118. For example, the ECC system 106 may generate a Hamming code or other suitable coding of the cache line 118. In some examples, the set of ECC bits 120 includes one bit for every eight bits of the cache line 118. For example, a 512 bit cache line may have a set of 64 ECC bits.

The cache line 118 may be provided to the memory encryption system 126, which may encrypt the cache line 118 utilizing any suitable cryptographic method to generate an encrypted cache line 122. For example, the memory encryption system 126 may apply a symmetric encryption technique utilizing a memory encryption key 130. The encrypted cache line 122 may be written to the memory element 134A, 134B, 134N corresponding to the address indicated by the write request 116.

The set of ECC bits 120 generated by the ECC system 106 may be provided to the ECC bit encryption system 128. The ECC encryption system 128 may encrypt the set of ECC bits 120 utilizing a memory element ECC key or element ECC key 132A, 132B, 132N corresponding to the memory element 134A, 134B, 134N to which the cache line 118 is to be written. This may generate an encrypted set of ECC bits 124. For example, the element ECC key 132A, 132B, 132N may be determined from the address of the memory element 134A, 134B, 134N and/or from the encrypted cache line 122. In this way, the ECC bit encryption system 128 may utilize different element ECC keys to encrypt ECC bits associated with different memory elements 134A, 134B, 134N. As described herein, this may increase the security of environment 100 may making it more difficult for an attacker to observe a number of operations of any given key 132A, 132B, 132N that is above the birthday bound.

The encrypted set of ECC bits 124 may be written to an appropriate location at the memory 104. For example, the encrypted set of ECC bits 124 may be written to the memory element 134A, 134B, 134N where the encrypted cache line 122 was written and/or to another location associated with that memory element.

FIG. 1 also shows an example read request 114 requesting that the cache line 118 be retrieved from the memory 104. Although this example shows a read request for the same cache line 118 that was written by the write request 116, read requests for other cache lines may be handled in a similar manner. The memory controller 108 may receive the read request 114, for example, from the processor 112 and may include an address of a memory element 134A, 134B, 134N including the encrypted cache line 122. In some examples, the read request 114 may also indicate a location at the cache 110 and/or a register of the processor 112 where the memory controller 108 is to place the cache line 118 received from the indicated memory element 134A, 134B, 134N.

The memory controller 108 may request the cache line 118 from the memory 104. The memory 104 may provide the encrypted cache line 122 and the encrypted set of ECC bits associated with the encrypted cache line 122 to the memory encryption system 126 and ECC bit encryption system 128, respectively. The memory encryption system 126 may utilize the memory key 130 to decrypt the encrypted cache line 122, resulting in the cache line 118. The ECC bit encryption system 128 may decrypt the encrypted set of ECC bits 124 utilizing the element key 132A, 132B, 132N associated with the memory element 134A, 134B, 134N where the encrypted cache line 122 was stored to generate the set of ECC bits 120.

The cache line 118 and set of ECC bits 120 (now in the clear) may be provided to the ECC system 106. The ECC system 106 may compare the cache line 118 to the set of ECC bits 120. For example, the ECC system 106 may generate a test set of ECC bits from the cache line 118 and compare the test set of ECC bits to the set of ECC bits 120. If the test set of ECC bits matches the set of ECC bits 120, it may indicate that the cache line 118 is not corrupted. If the test set of ECC bits does not match the set of ECC bits 120, it may indicate corruption of the cache line 118. In this case, the ECC system 106 may generate and error indicating corruption of the cache line 118. In some examples, where the corruption represents flipping less than a threshold number of bits, the ECC system 106 may correct the corruption to generate the original cache line 118.

Figure 2:
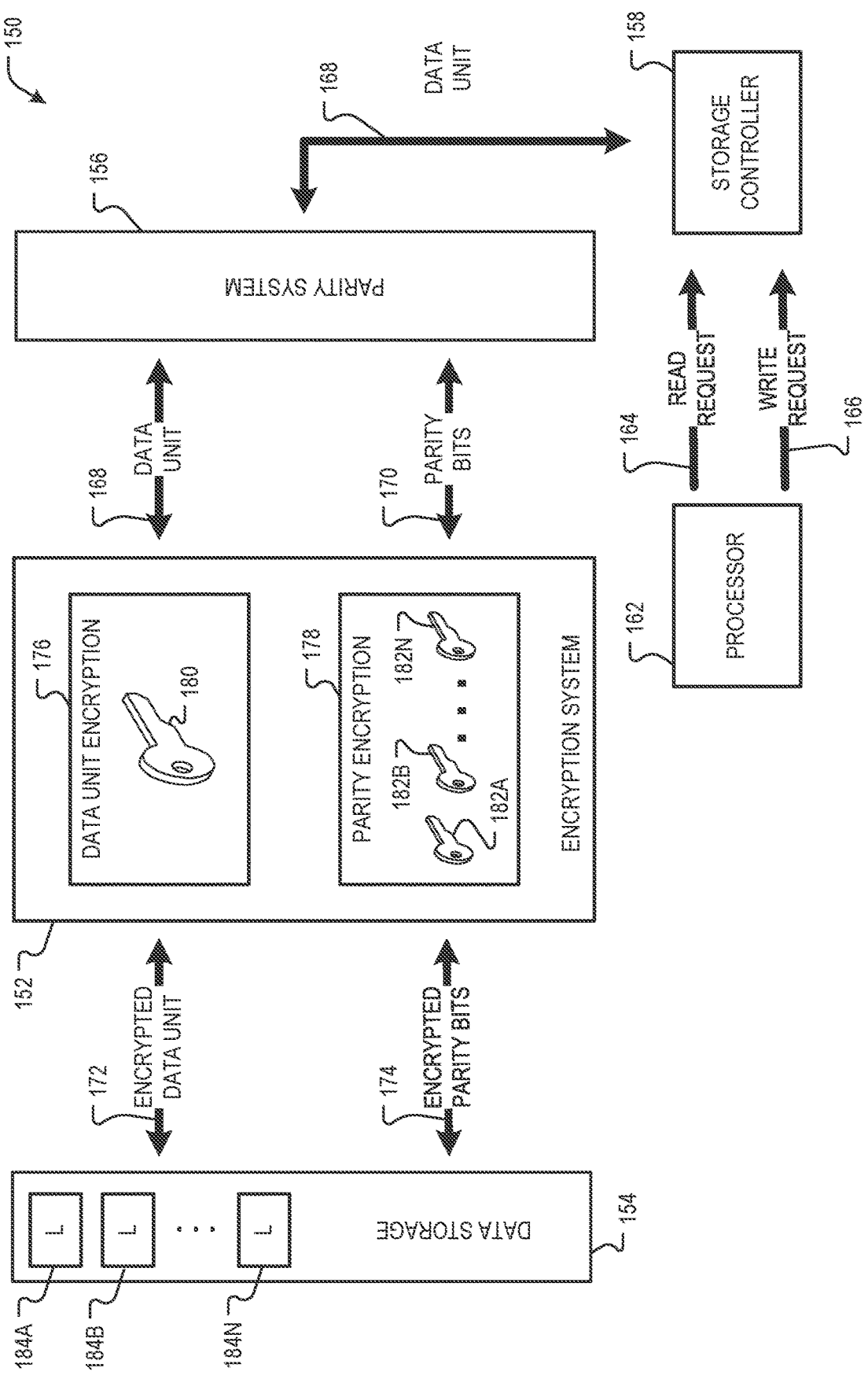
FIG. 2 is a diagram showing one example of an environment for implementing data storage encryption.

FIG. 2 is a diagram showing one example of an environment 150 for implementing data storage encryption. The environment 150 includes an encryption system 152, a data storage device 154, a parity system 156, and a storage controller 158. For example, the storage controller 158 may be a disk controller, a memory controller, etc. The components 152, 154, 156, 158 may be implemented using any suitable computing hardware. The environment 150 also includes an example processor 162.

The data storage device 154 may be any suitable type of volatile or non-volatile data storage including, for example, disk drives, flash drives, random access memory, etc. In some examples, the data storage device 154 may be a memory device, similar to the memory device 104. The storage device 154 may include storage locations 184A, 184B, 184N, where each storage location 184A, 184B, 184N may be individually addressable and stores one data unit. The size of a data unit may vary depending on the type of storage device 154 used. For example, storage locations on a disk drive may be referred to as blocks.

In the example environment 150, the encryption system 152 comprises a data unit encryption system 176 and a parity encryption system 178, although in some examples the functionality of these systems 176, 178 may be implemented by a single system. The data unit encryption system 176 may encrypt and decrypt data units stored at the data storage locations 184A, 184B, 184N of the data storage device 154. The parity encryption system 178 may encrypt and decrypt parity bits associated with the data units, for example, as described herein.

In the example shown in FIG. 2, the processor 162 may provide a write request 166 to the storage controller 158. The write request 116 may include a data unit 168 and an address of the storage location 184A, 184B, 184N to which the data unit 168 is to be written. In some examples, instead of including the data unit 168, the write request 166 may include a reference to the location of the data unit 168, for example, at a cache or other memory. The storage controller 158 may provide the data unit 168 to the parity system 156. The parity system 156 may determine a set of parity bits 170 for the data unit 168, for example, according to any suitable error detection and/or error correction technique. In some examples, the parity system is omitted and the set of parity bits 170 are determined by the storage controller 158 and/or another suitable component.

The data unit 168 and set of parity bits 170 may be provided to the encryption system 152. The encryption system 152 (e.g., the data unit encryption system 176) may encrypt the data unit 168, for example, utilizing any suitable cryptographic method to generate an encrypted data unit 172. For example, the encryption system 152 may apply a symmetric encryption technique utilizing a data unit encryption key 180. The encrypted data unit 172 may be written to the storage location 184A, 184B, 184N corresponding to the address indicated in the write request 166.

The set of parity bits 170 may be provided to the parity encryption system 178. The parity encryption system 178 may encrypt the set of parity bits 170 to form an encrypted set of parity bits 174 utilizing a storage location parity key or location parity key 182A, 182B, 182N that corresponds to the storage location 184A, 184B, 184N where the data unit 172 is to be stored. In some examples, location parity keys 182A, 182B, 182N may be determined from the address of the corresponding storage location 184A, 184B, 184N and/or from the encrypted data unit 172.

The encrypted set of parity bits 174 may be written to an appropriate location at the data storage device 154. For example, the encrypted set of parity bits 174 may be written to the same storage location 184A, 184B, 184N where the corresponding encrypted data unit 172 is written. In some examples, the encrypted parity bits 174 and encrypted data unit 172 may be written to a storage location 184A, 184B, 184N at the same time.

FIG. 2 also shows an example read request 164 requested that the data unit 168 be retrieved from the data storage device 104. Although this example shows a read request for the same data unit 168 that was written by the write request 166, read requests for other cache lines may be handled in a similar manner. The storage controller 158 may receive the read request 164, for example, from the processor 162 and may include an address of the storage location 184A, 184B, 184N including the encrypted data unit 172. In some examples, the read request 164 may also indicate a memory location, cache location, processor register, or other location where the data unit 168 is to be placed.

The storage controller 158 may request the data unit 168 from the data storage device 154. The data storage device may provide the encrypted data unit 172 and encrypted set of parity bits 174 to the encryption system 152. For example, the data unit encryption system 176 may utilize the data unit encryption key 180 to decrypt the encrypted data unit 172 to produce the data unit 168. The parity encryption system 178 may decrypt the encrypted set of parity bits 174 utilizing the location parity key 182A, 182B, 182N associated with the storage location 184A, 184B, 184N where the encrypted data unit 172 was stored to generate the set of parity bits 170.

The data unit 168 and set of parity bits 170 (now in the clear) may be provided to the parity system 156, which may compare the data unit 168 to the parity bits to detect and/or correct any errors in the data unit 168. If the parity bits indicate an error, the parity system 156 may correct the error (if possible) and/or indicate corruption of the data unit 168, for example, by generating an error indicating corruption of the data unit 168.

Figure 3:
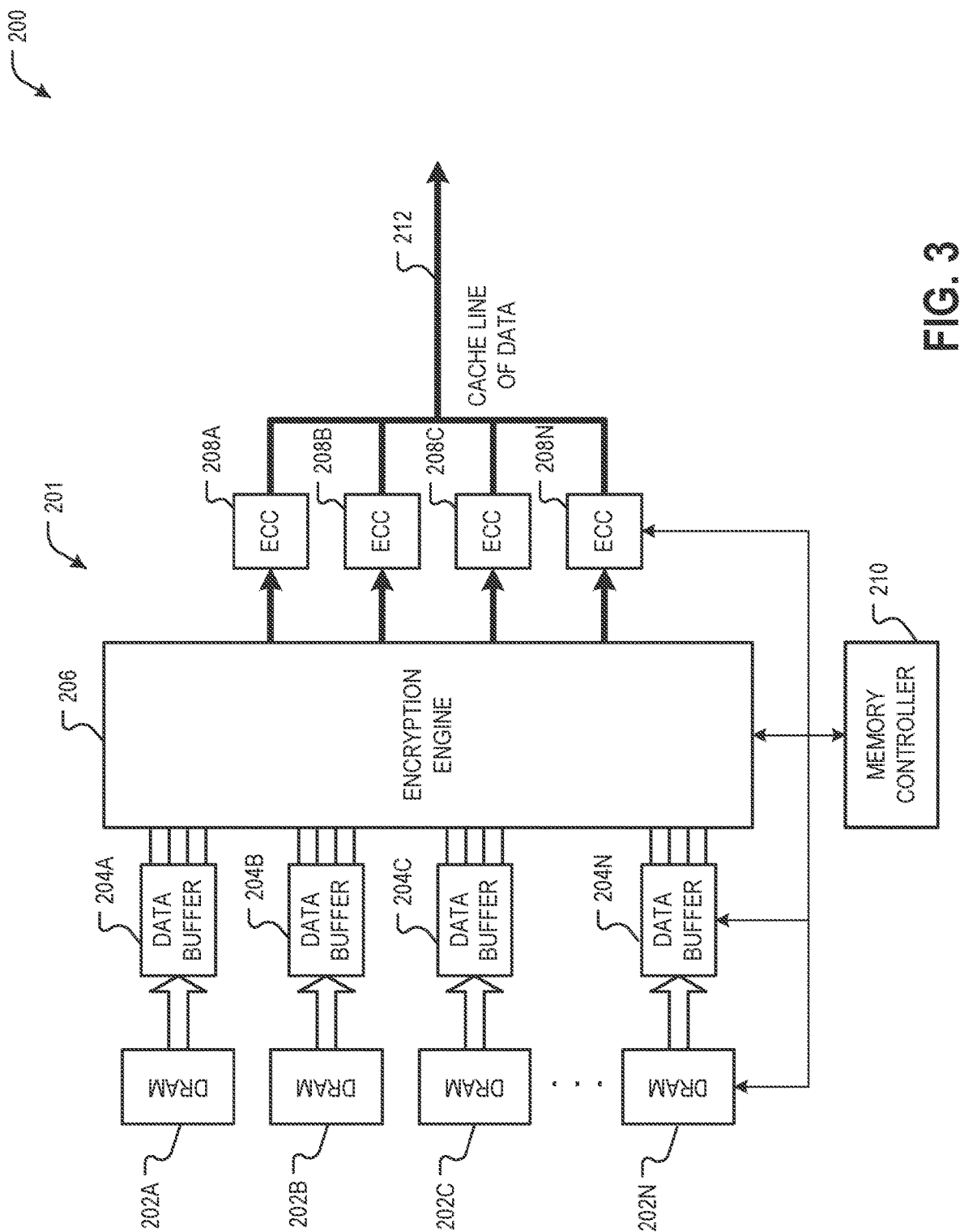
FIG. 3 is a diagram showing one example of a memory device that may implement memory encryption as described herein.

FIG. 3 is a diagram showing one example of an environment 200 that may implement memory encryption as described herein. The example environment 200 comprises a memory device 201 and a memory controller 210. In some examples, the memory controller 210 is incorporated into the memory device 201 and/or may be part of a processor and/or motherboard chipset. The memory device 201 may include DRAM arrays 202A, 202B, 202C, 202N.

DRAM arrays 202A, 202B, 202C, 202N may comprise various DRAM memory cells, for example, arranged in rows and columns. A row at a DRAM array 202A, 202B, 202C, 202N may correspond to all or part of a memory element. For example, a row at a DRAM array 202A, 202B, 202N may include a number of elements corresponding to part or all of a cache line. In some examples, a row at a DRAM element 202A, 202B, 202N may include 512 memory cells, with each cell storing one bit.

Data buffers 204A, 204B, 204C, 204N may be in communication with respective DRAM arrays 202A, 202B, 202C, 202N to receive cache lines from and provide cache lines to DRAM memory elements at the DRAM arrays 202A, 202B, 202C, 202N. For example, a memory controller 210 may instruct a DRAM array 202A, 202B, 202C, 202N to provide data stored at a particular memory element (e.g., a cache line) to its corresponding data buffer 204A, 204B, 204C, 204N. In some examples, data provided to the data buffers 204A, 204B, 204C, 204N may include a cache line as well as a stored set of ECC bits for the cache line. The set of ECC bits may be stored at the same memory element that also stores the corresponding cache line. In some examples, one or more of the DRAM arrays 202A, 202B, 202C, 202N and associated data buffers 204A, 204B, 204C, 204N may be reserved to store sets of ECC bits for cache lines stored at other DRAM arrays 202A, 202B, 202C, 202N. ECC circuits 208A, 208B, 208C, 208N may generate sets of ECC bits and compare stored sets of ECC bits to cache lines received from the DRAM arrays 202A, 202B, 202C, 202N. The resulting cache line may be provided to a bus 212. The memory controller 210 may direct cache lines provided to the bus 212 to a cache and/or processor register, for example, as described with respect to FIG. 1.

As shown in FIG. 3, a hardware encryption engine 206 is positioned between the DRAM arrays 202A, 202B, 202C, 202N and the ECC circuits 208A, 208B, 208C, 208N. In this way, ECC bits generated and/or verified by the ECC circuits 208A, 208B, 208C, 208N are encrypted, for example, as described herein, before the cache lines are stored at memory elements included at the DRAM arrays 202A, 202B, 202C, 202N. It will be appreciated that although FIG. 3 shows DRAM memory, the ECC bit encryption methods described herein may be utilized with any suitable memory technology.

The environment 200 may be one example implementation for components of the environment 100. For example, the DRAM arrays 202A, 202B, 202C, 202N and data buffers 204A, 204B, 204C, 204N show one example implementation of the memory 104. The encryption engine 206 shows one example implementation of the encryption system 102. The ECC circuits 208A, 208B, 208C, 208N show one example implementation of the ECC system 106.

Sets of ECC bits may be encrypted and decrypted in any suitable manner. For example, as described herein, ECC bits associated with different memory elements may be encrypted or decrypted with different element ECC keys. This may make it more difficult to break the encryption of ECC bits. For example, because there are fewer bits in a set of ECC bits than in the corresponding cache line, the birthday bound for a set of ECC bits may be lower than for the corresponding cache lines. The birthday bound describes a number of times that a cryptographic operation may be performed before the results are distinguishable from a random set. Once an attacker is able to observe more than the birthday bound of cryptographic operations performed with the same key, then cryptographic operations performed with the same key may be vulnerable to attack. Accordingly, examples that utilize different element ECC keys for each memory element may have element-specific birthday bounds. For example, it may be necessary for an attacker to observe the birthday bound number of operations for each specific memory element before the ECC bits for that element are vulnerable to attack.

Figure 4:
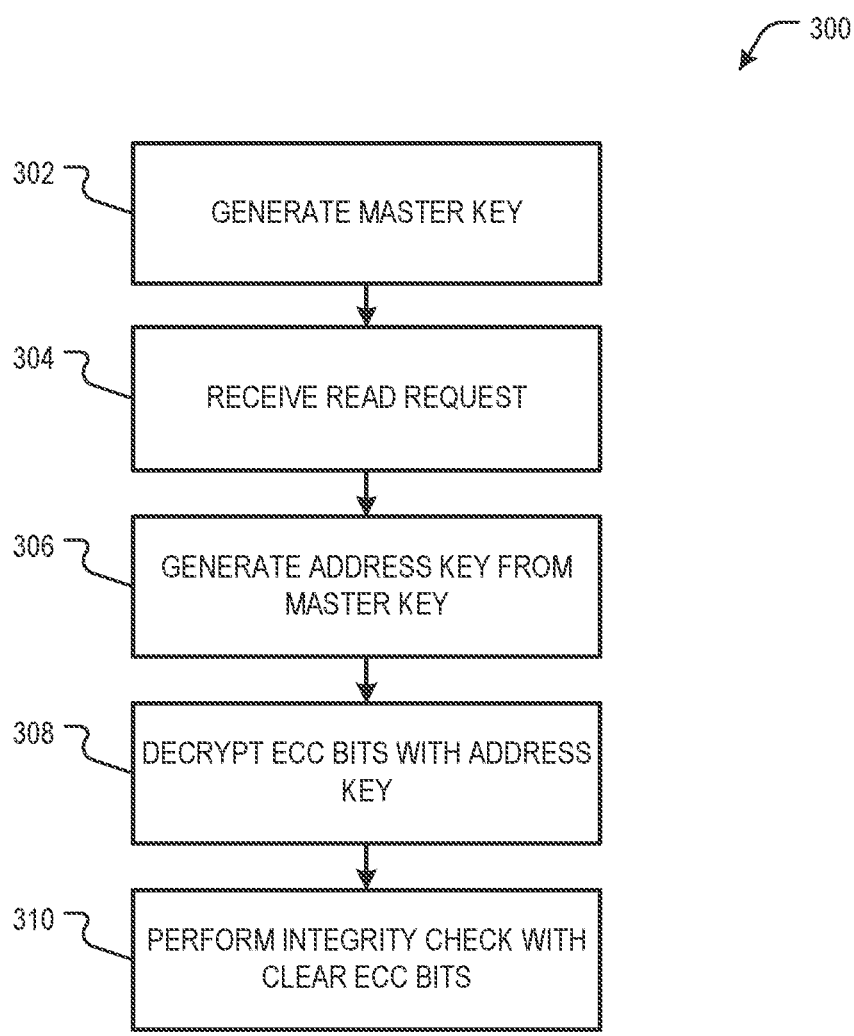
FIG. 4 is a flowchart showing one example of a process flow for responding to a read request to a memory device with encrypted ECC bits.

In some examples, a block cipher may be used to generate element ECC keys, for example, from a master ECC key. FIG. 4 is a flowchart showing one example of a process flow 300 for responding to a read request to a memory device with encrypted ECC bits. The process flow 300 may be executed in the environment 100 of FIG. 1 and may utilize a block cipher to encrypt ECC bits.

At operation 302, a master ECC key may be generated. The master ECC key may be generated, for example, by the encryption system 102, the memory controller 108 or other suitable component. For example, the master ECC key may be generated from one or more random values received from a random or pseudorandom number generator. The random or pseudorandom number generator may be implemented in hardware, software, or any suitable combination of the two. In some examples, the master ECC key may be generated based on the random number and the key used to encrypt cache lines themselves at the memory (e.g., the memory encryption key 130 in FIG. 1). The master ECC key may be generated, for example, at boot time. As such, in some examples, the master ECC key is generated once and is not re-generated for subsequent read or write request. Accordingly, if the master ECC key has already been generated, the operation 302 may be skipped.

At operation 304, the memory controller 108 may receive a read request, such as the read request 114. The read request may indicate a memory address of a memory element including a cache line to be read from the memory 104. At operation 306, the encryption system 102 and/or memory controller 108 may generate an element ECC key for the memory element referenced by the read request. In some examples, the element ECC key may be generated based on the master ECC key and the address of the corresponding memory element. The element ECC key may match the type of block cipher to be used. In an example with 512 bit cache words and sets of 64 ECC bits, a 64-bit block cipher, such as the Simon cipher, may be used. For example, the master ECC key may be a 128-bit key. In some examples, the memory controller 108 may instruct the memory 104 to provide the encrypted cache line and its associated encrypted set of ECC bits to the encryption system 102 while the encryption system 102 and/or memory controller 108 is generating the element ECC key, which may increase the speed of the memory access.

At operation 308, the encryption system 102 may decrypt the encrypted set of ECC bits using the element ECC key to generate a set of ECC bits. In some examples, the encryption system 102 also decrypts the encrypted cache line to generate the cache line. At operation 310, the ECC system 106 may perform an integrity check of the now-clear cache line utilizing the now-clear set of ECC bits. If the integrity check indicates no corruption, then processing may continue. If the integrity check indicates that the cache line is corrupted, then processing may cease and/or an alert may be generated.

Figure 5:
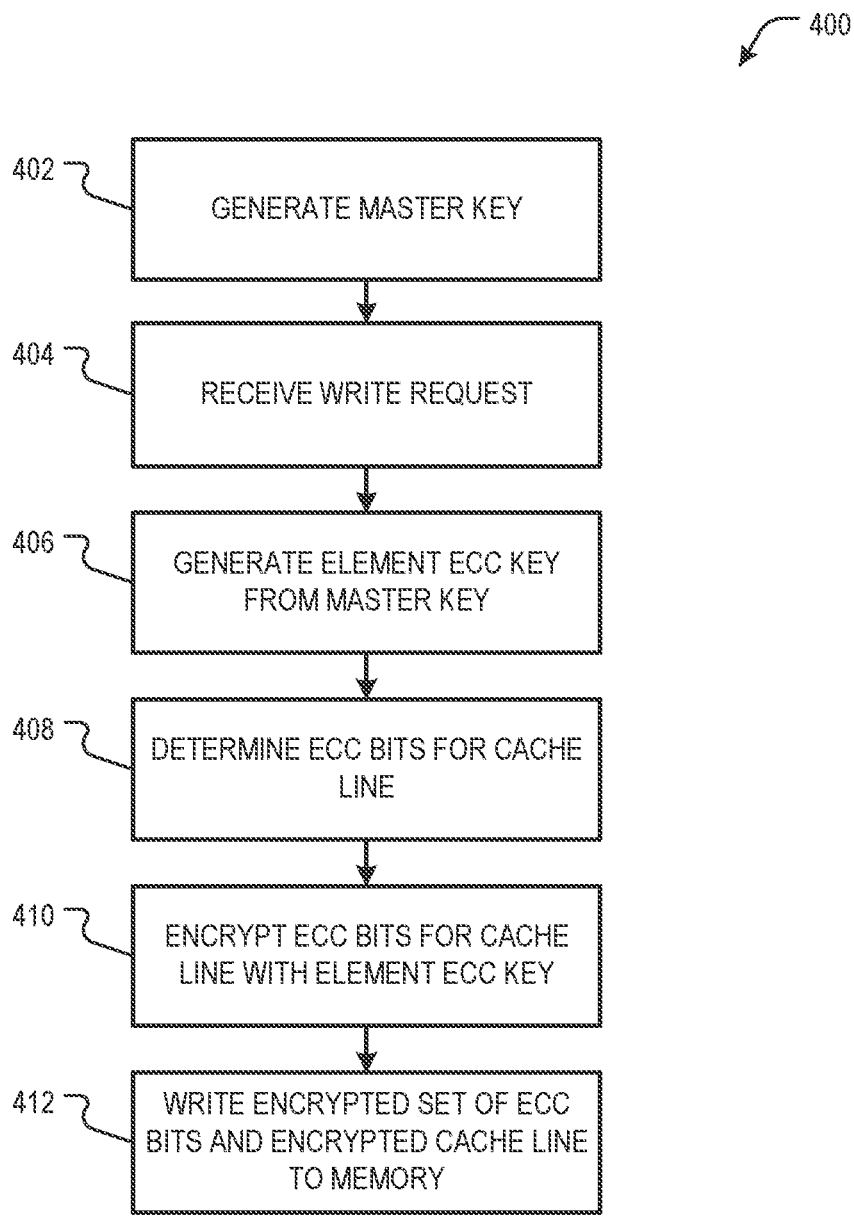
FIG. 5 is a flowchart showing one example of a process flow for responding to a write request to a memory device with encrypted ECC bits.

FIG. 5 is a flowchart showing one example of a process flow 400 for responding to a write request to a memory device with encrypted ECC bits. The process flow 400 may be executed in the environment 100 of FIG. 1 and may utilize a block cipher to encrypt ECC bits, similar to the process flow 300. At operation 402, the master ECC key may be generated. The master ECC key may be generated, for example, by the encryption system 102, the memory controller 108 or other suitable component. For example, the master ECC key may be generated from one or more random values received from a random or pseudorandom number generator. The random or pseudorandom number generator may be implemented in hardware, software, or any suitable combination of the two. In some examples, the master ECC key may be generated based on the random number and the key used to encrypt cache lines themselves at the memory (e.g., the memory encryption key 130 in FIG. 1). The master ECC key may be generated, for example, at boot time. As such, in some examples, the master ECC key is generated once and is not re-generated for subsequent read or write request. Accordingly, if the master ECC key has already been generated, the operation 402 may be skipped.

At operation 404, the memory controller 108 may receive a write request (similar to the write request 116 described at FIG. 1). The write request may indicate a memory address of a memory element and a cache line to be written to that memory element. For example, the write request may include the cache line and/or may include a reference to a cache, such as the cache 110, that includes the cache line.

At operation 406, the memory controller 108 and/or encryption system 102 may generate an element ECC key for the memory element referenced by the write request. For example, the element ECC key may be generated based on the master ECC key and the address of the referenced memory element, in a manner similar to that described above at operation 306. At operation 408, the ECC system 106 may determine the set of ECC bits for the cache line to be written. At operation 410, the encryption system 102 may encrypt the set of ECC bits generated at operation 408 utilizing the element ECC key generated at operation 406. In some examples, the encryption system 102 may also encrypt the cache line, for example, utilizing a memory encryption key or any other suitable method. At operation 412, the encrypted set of ECC bits and the encrypted cache line may be written to the memory 104. Although the process flows 300 and 400 are described as implemented in the environment 100, in various examples, the process flows 300 and 400 may be implemented in the environment 150. For example, the location parity keys 182A, 182B, 182N may be generated utilizing a master parity key similar to the master ECC key described and used to encrypted sets of parity bits in a manner similar to that described in the process flows 300 and 400.

Examples that encrypt ECC bits using a block cipher, for example, as described in FIGS. 4-5, may provide a degree of protection based on the number of bits. For example, for cache lines of 512 bits and sets of 64 ECC bits, the birthday bound for any give memory element may be about 2^32. In some examples, the security of the computing device may be increased further by using a truncated random sequence technique to encrypt and decrypt the ECC bits, as described herein. In some examples, utilizing a truncated random sequence technique for 512 bit cache lines with sets of 64 ECC bits may lead to a birthday bound of about 2^64, providing additional security.

Figure 6:
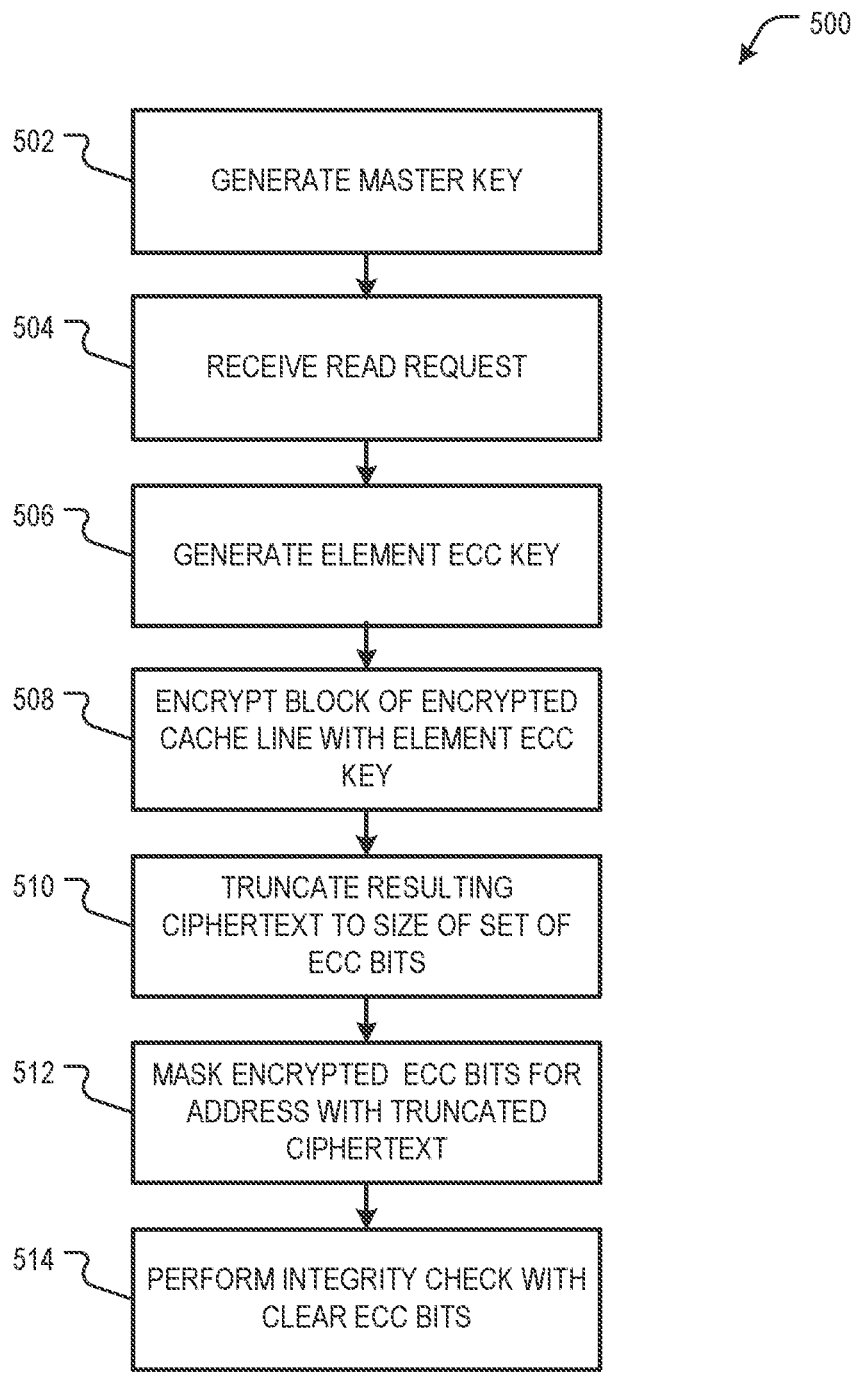
FIG. 6 is a flowchart showing one example of a process flow for responding to a read request to a memory device with ECC bits encrypted utilizing a truncated random sequence technique.

FIG. 6 is a flowchart showing one example of a process flow 500 for responding to a read request to a memory device with ECC bits encrypted utilizing a truncated random sequence technique. In some examples, utilizing a truncated random sequence technique to encrypt the ECC bits, as in the example of FIG. 6, may increase the birthday bound as described herein.

The process flow 500 may be executed in the environment 100 of FIG. 1. At operation 502, a master ECC key may be generated, for example, in a manner similar to that described above with respect to operations 302 and 402. Also, in some examples, the master ECC key may be generated, for example, at boot time. As such, in some examples, the master ECC key is generated once and is not re-generated for subsequent read or write request. Accordingly, if the master ECC key has already been generated, the operation 502 may be skipped.

At operation 504, the memory controller 108 may receive a read request, such as the read request 114. The read request may indicate a memory address of a memory element including a cache line to be read from the memory 104. At operation 506, the encryption system 102 and/or memory controller 108 may generate an element ECC key for the memory element referenced by the read request, for example, in a manner similar to that described above with respect to operations 306 and 406.

At operation 508, the encryption system 102 may encrypt a block of the encrypted cache line with the element ECC key. The encrypted cache line may be received by the encryption system 102 from the memory 104. The encryption system 102 may select any block of the encrypted cache line such as, for example, a block from the beginning of the encrypted cache line, a block from the end of the encrypted cache line, a block from the middle of the encrypted cache line, etc. In some examples, the size of the selected block may depend on the size of the set of ECC bits. In an example where the cache line includes 512 bits, the set of ECC bits may include 64 bits and the selected block may include 128 bits or twice the number of ECC bits. The selected block may be encrypted with the element ECC key using a suitable cipher. For example, when the block includes 128 bits, a 128 bit block cipher such as AES may be used. The result of operation 508 may be a ciphertext block of the same length as the block selected from the encrypted cache line. For example, when a 128 bit block is used, the resulting ciphertext may have 128 bits.

At operation 510, the encryption system 102 may truncate the ciphertext generated at operation 508 to a length equal to a number of ECC bits in a set of ECC bits for a memory element. For example, when 512 bit cache lines and 64 ECC bits are used, the encryption system 102 may truncate the ciphertext to 64 bits. Any suitable truncation technique may be used. For example, the encryption system 102 may retain the first bits of the ciphertext, the last bits of the ciphertext, etc.

At operation 512, the encryption system 102 may mask the encrypted set of ECC bits with the truncated ciphertext, for example, by performing an exclusive (XOR) of the corresponding bits of the truncated ciphertext and the encrypted set of ECC bits. The encrypted set of ECC bits may have been received from the memory 104, for example, as described herein. This may result in the clear set of ECC bits. At operation 514, the ECC system 106 may perform an integrity check on the clear cache line (e.g., also generated by the encryption system 102), for example as described above with respect to operation 310.

Figure 7:
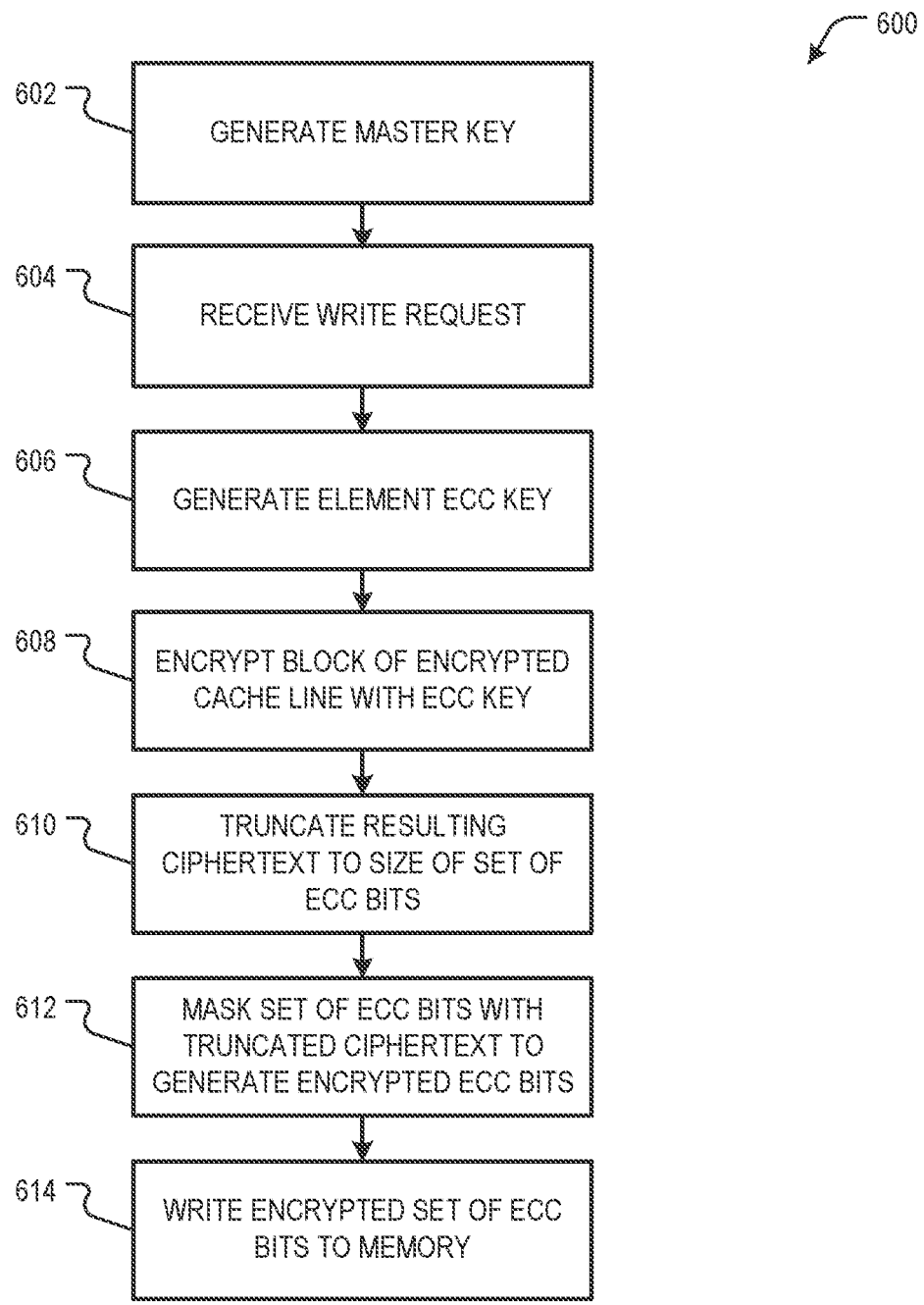
FIG. 7 is a flowchart showing one example of a process flow for responding to a write request to a memory device with ECC bits encrypted utilizing a truncated random sequence technique.

FIG. 7 is a flowchart showing one example of a process flow 600 for responding to a write request to a memory device with ECC bits encrypted utilizing a truncated random sequence technique. The process flow 600 may be executed in the environment 100. At operation 602, a master ECC key may be generated, for example, in a manner similar to that described above with respect to operations 302 and 402. Also, in some examples, the master ECC key may be generated, for example, at boot time. As such, in some examples, the master ECC key is generated once and is not re-generated for subsequent read or write request. Accordingly, if the master ECC key has already been generated, the operation 602 may be skipped.

At operation 604, the memory controller 108 may receive a write request (similar to the write request 116 described at FIG. 1). The write request may indicate a memory address of a memory element and a cache line to be written to that memory element. For example, the write request may include the cache line and/or may include a reference to a cache, such as the cache 110, that includes the cache line.

At operation 606, the memory controller 108 and/or encryption system 102 may generate an element ECC key for the memory element referenced by the write request. For example, the element ECC key may be generated based on the master ECC key and the address of the referenced memory element, in a manner similar to that described above at operation 306. At operation 608, the encryption system 102 may encrypt a block of the encrypted cache line with the element ECC key. The encrypted cache line may also be generated by the encryption system 102 and/or by another component. The block of the encrypted cache line to be encrypted with the element ECC key may be chosen in any suitable manner, for example, as described above with respect to the operation 508.

The ciphertext generated at operation 608 may be truncated at operation 610, for example, similar to the manner described above with respect to operation 510. At operation 612, the encryption system 102 may mask the set of ECC bits for the cache line with the truncated ciphertext generated at operation 608. For example, the ECC system 106 may generate the set of ECC bits from the cache line. Masking the set of ECC bits with the truncated ciphertext may generate the encrypted set of ECC bits, which may be written to the memory 104 at operation 614.

Although the process flows 500 and 600 are described as implemented in the environment 100, in various examples, the process flows 500 and 600 may be implemented in the environment 150. For example, the location parity keys 182A, 182B, 182N may be generated and used to encrypted sets of parity bits in a manner similar to that described in the process flows 500 and 600.

Figure 8:
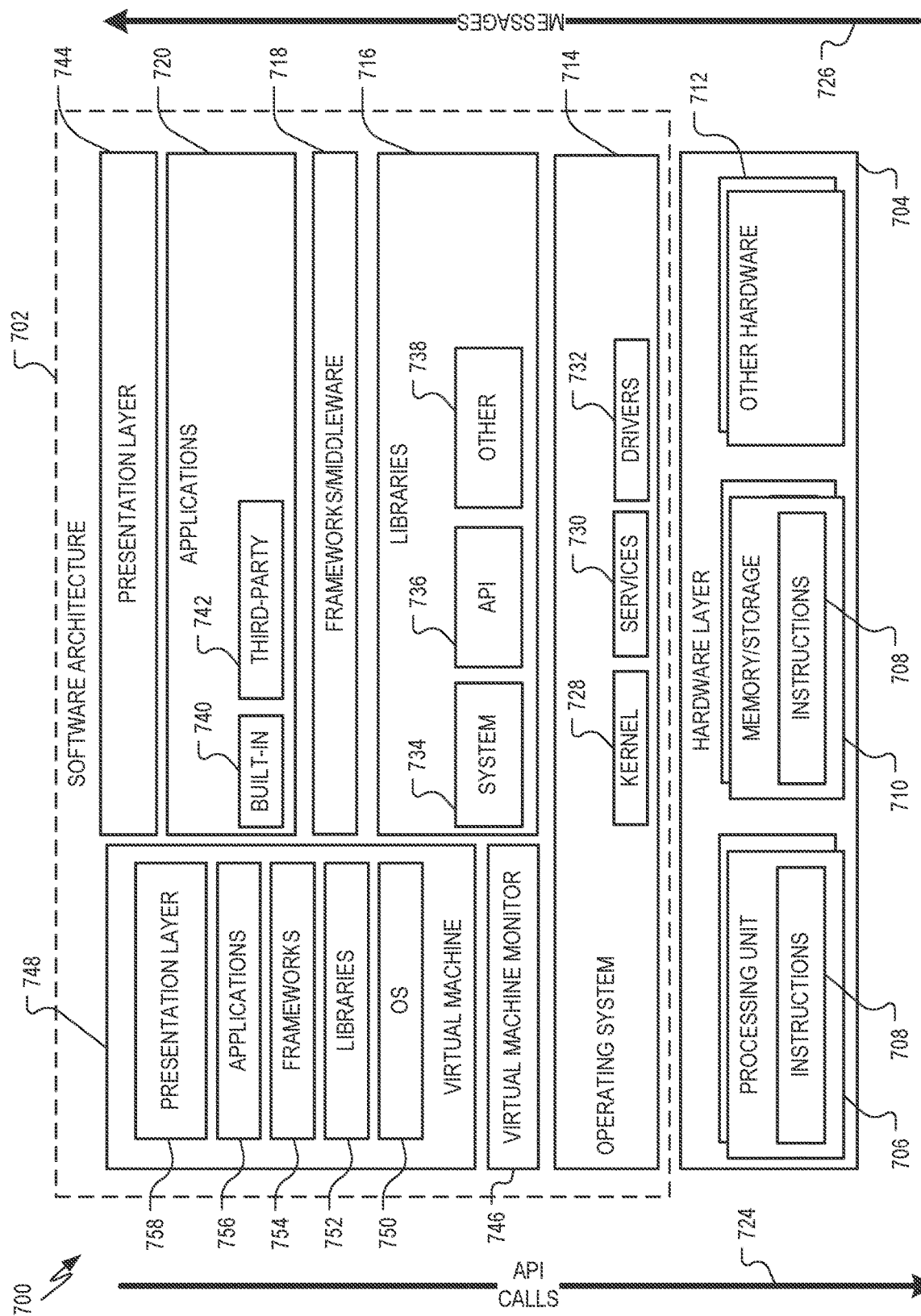
FIG. 8 is a block diagram showing one example of a software architecture for a computing device.

FIG. 8 is a block diagram 700 showing one example of a software architecture 702 for a computing device. The architecture 702 maybe used in conjunction with various hardware architectures, for example, as described herein. FIG. 8 is merely a non-limiting example of a software architecture 702 and many other architectures may be implemented to facilitate the functionality described herein. A representative hardware layer 704 is illustrated and may represent, for example, any of the above referenced computing devices. In some examples, the hardware layer 704 may be implemented according to the architecture 702 of FIG. 8 and/or the architecture 1000 of FIG. 10.

The representative hardware layer 704 comprises one or more processing units 706 having associated executable instructions 708. Executable instructions 708 represent the executable instructions of the software architecture 702, including implementation of the methods, modules, components, and so forth of FIGS. 1-8. Hardware layer 704 also includes memory and/or storage modules 710, which also have executable instructions 708. Hardware layer 704 may also comprise other hardware as indicated by other hardware 712 which represents any other hardware of the hardware layer 704, such as the other hardware illustrated as part of hardware architecture 800.

In the example architecture of FIG. 8, the software 702 may be conceptualized as a stack of layers where each layer provides particular functionality. For example, the software 702 may include layers such as an operating system 714, libraries 716, frameworks/middleware 718, applications 720 and presentation layer 744. Operationally, the applications 720 and/or other components within the layers may invoke application programming interface (API) calls 724 through the software stack and receive a response, returned values, and so forth illustrated as messages 726 in response to the API calls 724. The layers illustrated are representative in nature and not all software architectures have all layers. For example, some mobile or special purpose operating systems may not provide a frameworks/middleware layer 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of a hardware or software interrupt and, in response, cause the architecture 702 to pause its current processing and execute an interrupt service routine (ISR) when an interrupt is received.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration The libraries 716 may provide a common infrastructure that may be utilized by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 716 may include system 734 libraries (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) may provide a higher-level common infrastructure that may be utilized by the applications 720 and/or other software components/modules. For example, the frameworks 718 may provide various graphic user interface (GUI) functions, high-level resource management, high-level location services, and so forth. The frameworks 718 may provide a broad spectrum of other APIs that may be utilized by the applications 720 and/or other software components/modules, some of which may be specific to a particular operating system or platform.

The applications 720 includes built-in applications 740 and/or third party applications 742. Examples of representative built-in applications 740 may include, but are not limited to, a contacts application, a browser application, a book reader application, a location application, a media application, a messaging application, and/or a game application. Third party applications 742 may include any of the built in applications as well as a broad assortment of other applications. In a specific example, the third party application 742 (e.g., an application developed using the Android™ or iOS™ software development kit (SDK) by an entity other than the vendor of the particular platform) may be mobile software running on a mobile operating system such as iOS™ Android™, Windows® Phone, or other mobile computing device operating systems. In this example, the third party application 742 may invoke the API calls 724 provided by the mobile operating system such as operating system 714 to facilitate functionality described herein.

The applications 720 may utilize built in operating system functions (e.g., kernel 728, services 730 and/or drivers 732), libraries (e.g., system 734, APIs 736, and other libraries 738), frameworks/middleware 718 to create user interfaces to interact with users of the system. Alternatively, or additionally, in some systems interactions with a user may occur through a presentation layer, such as presentation layer 744. In these systems, the application/module "logic" may be separated from the aspects of the application/module that interact with a user.

Some software architectures utilize virtual machines. For example, systems described herein may be executed utilizing one or more virtual machines executed at one or more server computing machines. In the example of FIG. 8, this is illustrated by virtual machine 748. A virtual machine creates a software environment where applications/modules may execute as if they were executing on a hardware computing device. A virtual machine is hosted by a host operating system (operating system 714) and typically, although not always, has a virtual machine monitor 746, which manages the operation of the virtual machine as well as the interface with the host operating system (i.e., operating system 714). A software architecture executes within the virtual machine such as an operating system 750, libraries 752, frameworks/middleware 754, applications 756 and/or presentation layer 758. These layers of software architecture executing within the virtual machine 748 may be the same as corresponding layers previously described or may be different.

Figure 9:
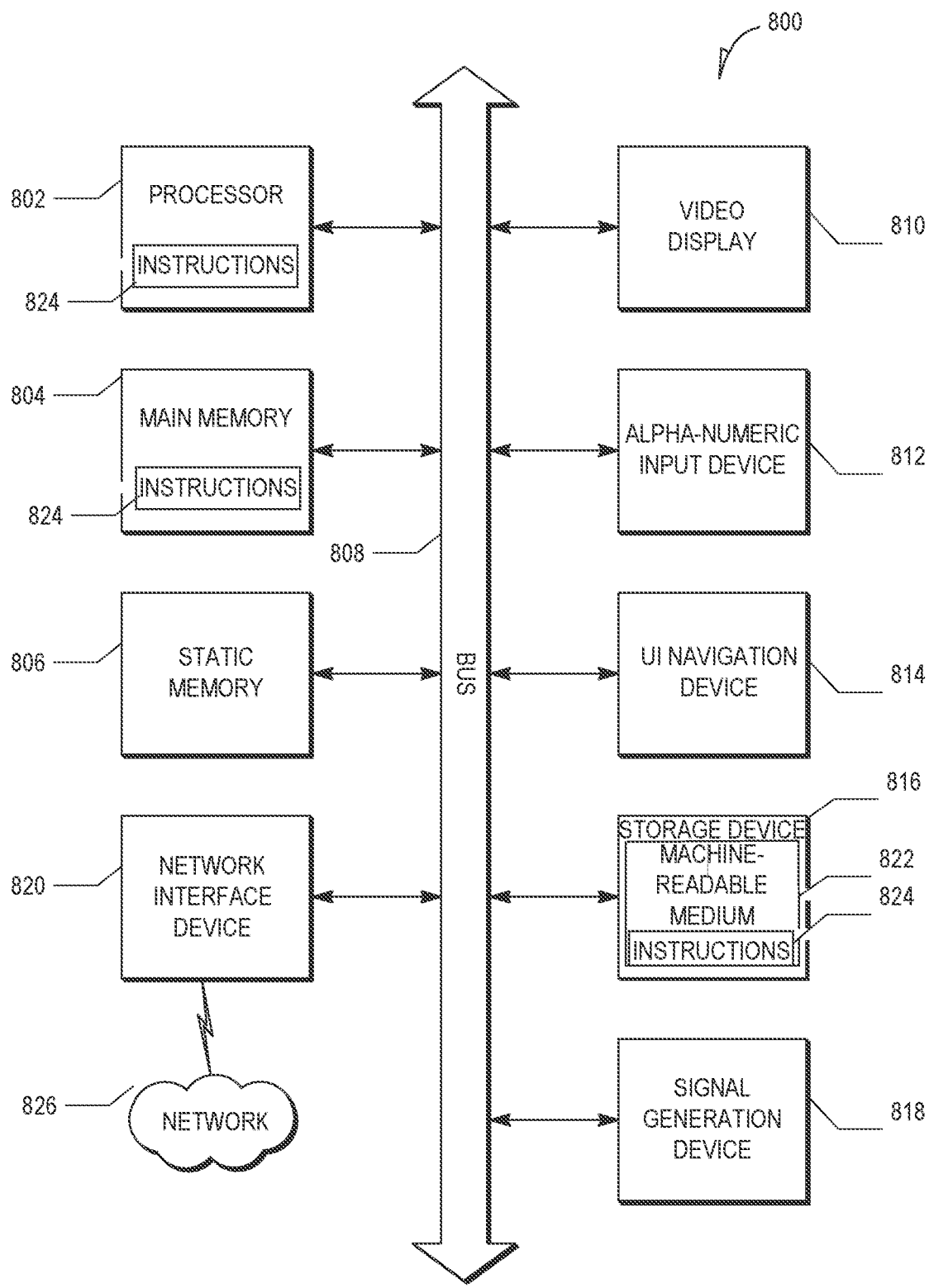
FIG. 9 is a block diagram illustrating a computing device hardware architecture, within which a set or sequence of instructions may be executed to cause the machine to perform examples of any one of the methodologies discussed herein.

FIG. 9 is a block diagram illustrating a computing device hardware architecture 800, within which a set or sequence of instructions may be executed to cause the machine to perform examples of any one of the methodologies discussed herein. For example, the architecture 800 may execute the software architecture 702 described with respect to FIG. 8. The architecture 800 may operate as a standalone device or may be connected (e.g., networked) to other machines. In a networked deployment, the architecture 800 may operate in the capacity of either a server or a client machine in server-client network environments, or it may act as a peer machine in peer-to-peer (or distributed) network environments. The architecture 800 may be implemented in a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify operations to be taken by that machine.

Example architecture 800 includes a processor unit 802 comprising at least one processor (e.g., a central processing unit (CPU), a graphics processing unit (GPU) or both, processor cores, compute nodes, etc.). The architecture 800 may further comprise a main memory 804 and a static memory 806, which communicate with each other via a link 808 (e.g., bus). The architecture 800 may further include a video display unit 810, an alphanumeric input device 812 (e.g., a keyboard), and a user interface (UI) navigation device 814 (e.g., a mouse). In some examples, the video display unit 810, input device 812 and UI navigation device 814 are incorporated into a touch screen display. The architecture 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, or other sensor.

In some examples, the processor unit 802 or other suitable hardware component may support a hardware interrupt. In response to a hardware interrupt, the processor unit 802 may pause its processing and execute an interrupt service routine (ISR), for example, as described herein.

The storage device 816 includes a computer readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the architecture 800, with the main memory 804, static memory 806, and the processor 802 also constituting computer readable media. Instructions stored at the computer readable medium 822 may include, for example, instructions for implementing the software architecture 702, instructions for executing any of the features described herein, etc.

While the computer readable medium 822 is illustrated in an example to be a single medium, the term "computer readable medium" may include a single medium or multiple media (e.g., a centralized or distributed database, and/or associated caches and servers) that store the one or more instructions 824. The term "computer readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "computer readable medium" shall accordingly be taken to include, but not be limited to, solid-state memories, and optical and magnetic media. Specific examples of computer readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Examples, as described herein, may include, or may operate on, logic or a number of components, engines, or modules, circuits, which for the sake of consistency are termed circuits, although it will be understood that these terms may be used interchangeably. Circuits may be hardware, software, or firmware communicatively coupled to one or more processors in order to carry out the operations described herein. Circuits may be hardware circuits, and as such circuits may be considered tangible entities capable of performing specified operations and may be configured or arranged in a certain manner. In an example, circuits may be arranged (e.g., internally or with respect to external entities such as other circuits) in a specified manner as a circuit. In an example, the whole or part of one or more computing platforms (e.g., a standalone, client or server computing platform) or one or more hardware processors may be configured by firmware or software (e.g., instructions, an application portion, or an application) as a circuit that operates to perform specified operations. In an example, the software may reside on a computer readable medium. In an example, the software, when executed by the underlying hardware of the circuit, causes the hardware to perform the specified operations. Accordingly, the term hardware circuit is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which circuits are temporarily configured, each of the circuits need not be instantiated at any one moment in time. For example, where the circuits comprise a general-purpose hardware processor configured using software; the general-purpose hardware processor may be configured as respective different circuits at different times. Software may accordingly configure a hardware processor, for example, to constitute a particular circuit at one instance of time and to constitute a different circuit at a different instance of time.

ADDITIONAL NOTES & EXAMPLES

Example 1 is a data storage system with encryption support comprising: a data storage device comprising a plurality of storage locations, the plurality of storage locations comprising a first storage location associated with a first address; a storage controller to receive a read request directed to the data storage device, wherein the read request comprises address data indicating the first address; wherein the storage controller is to request from the data storage device a first encrypted data unit stored at the first storage location and a first encrypted set of parity bits associated with the first storage location; and an encryption system to decrypt the first encrypted set of parity bits to generate a first set of parity bits based at least in part on an a first location parity key for the first address.

In Example 2, the subject matter of Example 1 optionally includes wherein the encryption system is also to decrypt the first encrypted data unit based at least in part on a data unit encryption key.

In Example 3, the subject matter of any one or more of Examples 1-2 optionally includes: wherein the encryption system is to generate a master parity key; and wherein the encryption system is to generate the first location parity key for the first storage location based at least in part on the master parity key and the first address.

In Example 4, the subject matter of Example 3 optionally includes wherein the encryption system is to generate the first location parity key after the storage controller receives the read request.

In Example 5, the subject matter of any one or more of Examples 3-4 optionally includes wherein the encryption system is to generate the master parity key based at least in part on a data unit encryption key for decrypting the first encrypted data unit and a value generated by a random number generator.

In Example 6, the subject matter of any one or more of Examples 1-5 optionally includes wherein the encryption system is to decrypt the first encrypted set of parity bits by performing operations comprising: encrypting a block of the first encrypted data unit based at least in part on the first location parity key to generate a ciphertext; truncating the ciphertext to generate a truncated ciphertext; and masking the first encrypted set of parity bits with the truncated ciphertext to generate the first set of parity bits.

In Example 7, the subject matter of any one or more of Examples 1-6 optionally includes: wherein the storage controller is also to receive a write request directed to a second storage location of the data storage device associated with a second address, wherein the write request comprises a second data unit and second address data indicating the second address; and wherein the encryption system is to encrypt a second set of parity bits for the second data unit based at least in part on a second location parity key for the second address.

In Example 8, the subject matter of Example 7 optionally includes: wherein the encryption system is to generate a master parity key; and wherein the encryption system is to generate the second location parity key based at least in part on the master parity key and the second address.

In Example 9, the subject matter of any one or more of Examples 7-8 optionally includes wherein the encryption system is to encrypt the second set of parity bits by performing operations comprising: encrypting a block of a second encrypted data unit based at least in part on the second location parity key to generate a ciphertext; truncating the ciphertext to generate a truncated ciphertext; and masking the second set of parity bits with the truncated ciphertext to generate an encrypted second set of parity bits.

In Example 10, the subject matter of any one or more of Examples 1-9 optionally includes wherein the data storage device comprises a memory device, and wherein the first set of parity bits comprises a set of Error Correction Code (ECC) bits.

Example 11 is a method for securing a data storage device, comprising: receiving, by a storage controller, a read request directed to a data storage device, wherein the read request comprises address data indicating a first address of a first storage location at the data storage device; requesting, by the storage controller, from the data storage device a first encrypted data unit stored at the first storage location and a first encrypted set of parity bits associated with the first storage location; and decrypting, by an encryption system, the first encrypted set of parity bits to generate a first set of parity bits based at least in part on an a first location parity key for the first address.

In Example 12, the subject matter of Example 11 optionally includes decrypting the first encrypted data unit based at least in part on a data unit encryption key.

In Example 13, the subject matter of any one or more of Examples 11-12 optionally includes generating a master parity key; and generating the first location parity key for the first storage location based at least in part on the master parity key and the first address.

In Example 14, the subject matter of Example 13 optionally includes generating the first location parity key after the storage controller receives the read request.

In Example 15, the subject matter of any one or more of Examples 13-14 optionally includes generating the master parity key based at least in part on a data unit encryption key for decrypting the first encrypted data unit and a value generated by a random number generator.

In Example 16, the subject matter of any one or more of Examples 11-15 optionally includes wherein decrypting the first encrypted set of parity bits comprises: encrypting a block of the first encrypted data unit based at least in part on the first location parity key to generate a ciphertext; truncating the ciphertext to generate a truncated ciphertext; and masking the first encrypted set of parity bits with the truncated ciphertext to generate the first set of parity bits.

In Example 17, the subject matter of any one or more of Examples 11-16 optionally includes receiving a write request directed to a second storage location of the data storage device associated with a second address, wherein the write request comprises a second data unit and second address data indicating the second address; and encrypting a second set of parity bits for the second data unit based at least in part on a second location parity key for the second address.

In Example 18, the subject matter of Example 17 optionally includes generating a master parity key; and generating the second location parity key based at least in part on the master parity key and the second address.

In Example 19, the subject matter of any one or more of Examples 17-18 optionally includes wherein encrypting the second set of parity bits comprises: encrypting a block of a second encrypted data unit based at least in part on the second location parity key to generate a ciphertext; truncating the ciphertext to generate a truncated ciphertext; and masking the second set of parity bits with the truncated ciphertext to generate an encrypted second set of parity bits.

In Example 20, the subject matter of any one or more of Examples 11-19 optionally includes wherein the data storage device comprises a memory device, and wherein the first set of parity bits comprises a set of Error Correction Code (ECC) bits.

Example 21 is at least one computer readable medium comprising instructions to perform the method of any of Examples 11-20.

Example 22 is an apparatus comprising means for performing the method of any of Examples 11-20.

Example 23 is a data storage apparatus, comprising: means for receiving a read request directed to a data storage device, wherein the read request comprises address data indicating a first address of a first storage location at the data storage device; means for requesting from a data storage device a first encrypted data unit stored at the first storage location and a first encrypted set of parity bits associated with the first storage location; and means for decrypting the first encrypted set of parity bits to generate a first set of parity bits based at least in part on an a first location parity key for the first address.

In Example 24, the subject matter of Example 23 optionally includes means for decrypting the first encrypted data unit based at least in part on a data unit encryption key.

In Example 25, the subject matter of any one or more of Examples 23-24 optionally includes means for generating a master parity key; and means for generating the first location parity key for the first storage location based at least in part on the master parity key and the first address.

In Example 26, the subject matter of Example 25 optionally includes means for generating the first location parity key after receiving the read request.

In Example 27, the subject matter of any one or more of Examples 25-26 optionally includes means for generating the master parity key based at least in part on a data unit encryption key for decrypting the first encrypted data unit and a value generated by a random number generator.

In Example 28, the subject matter of any one or more of Examples 23-27 optionally includes wherein decrypting the first encrypted set of parity bits comprises: encrypting a block of the first encrypted data unit based at least in part on the first location parity key to generate a ciphertext; truncating the ciphertext to generate a truncated ciphertext; and masking the first encrypted set of parity bits with the truncated ciphertext to generate the first set of parity bits.

In Example 29, the subject matter of any one or more of Examples 23-28 optionally includes means for receiving a write request directed to a second storage location of the data storage device associated with a second address, wherein the write request comprises a second data unit and second address data indicating the second address; and means for encrypting a second set of parity bits for the second data unit based at least in part on a second location parity key for the second address.

In Example 30, the subject matter of Example 29 optionally includes generating a master parity key; and generating the second location parity key based at least in part on the master parity key and the second address.

In Example 31, the subject matter of any one or more of Examples 29-30 optionally includes wherein encrypting the second set of parity bits comprises: encrypting a block of a second encrypted data unit based at least in part on the second location parity key to generate a ciphertext; truncating the ciphertext to generate a truncated ciphertext; and masking the second set of parity bits with the truncated ciphertext to generate an encrypted second set of parity bits.

In Example 32, the subject matter of any one or more of Examples 23-31 optionally includes wherein the data storage device comprises a memory device, and wherein the first set of parity bits comprises a set of Error Correction Code (ECC) bits.

Example 33 is a data storage system with encryption support comprising: a data storage device comprising a plurality of storage locations, the plurality of storage locations comprising a first storage location associated with a first address; a storage controller to receive a write request directed to the data storage device, wherein the write request comprises address data indicating the first address and an indication of a data unit; an encryption system to encrypt a first set of parity bits corresponding to the data unit basted at least in part on a first location parity key for the first address.

In Example 34, the subject matter of Example 33 optionally includes wherein the encryption system is also to encrypt the data unit based at least in part on a data unit encryption key.

In Example 35, the subject matter of any one or more of Examples 33-34 optionally includes wherein the encryption system is to generate a master parity key; and wherein the encryption system is to generate the first location parity key for the first storage location based at least in part on the master parity key and the first address.

In Example 36, the subject matter of Example 35 optionally includes wherein the encryption system is to generate the first location parity key after the storage controller receives the write request.

In Example 37, the subject matter of any one or more of Examples 35-36 optionally includes wherein the encryption system is to generate the master parity key based at least in part on a data unit encryption key for encrypting the data unit and a value generated by a random number generator.

In Example 38, the subject matter of any one or more of Examples 33-37 optionally includes wherein the encryption system is to encrypt the first set of parity bits comprises: encrypting a block of an encrypted data unit based at least in part on the first location parity key to generate a ciphertext; truncating the ciphertext to generate a truncated ciphertext; and masking the first set of parity bits with the truncated ciphertext to generate the first encrypted set of parity bits.

In Example 39, the subject matter of any one or more of Examples 33-38 optionally includes wherein the data storage device comprises a memory device, and wherein the first set of parity bits comprises a set of Error Correction Code (ECC) bits.

Example 40 is a method for securing a data storage device, comprising: receiving, by a storage controller, a write request directed to a data storage device, wherein the write request comprises address data indicating a first address and an indication of a data unit; encrypting, by an encryption system, a first set of parity bits corresponding to the data unit basted at least in part on a first location parity key for the first address.

In Example 41, the subject matter of Example 40 optionally includes encrypting the data unit based at least in part on a data unit encryption key.

In Example 42, the subject matter of any one or more of Examples 40-41 optionally includes generating a master parity key; and generating the first location parity key for the first storage location based at least in part on the master parity key and the first address.

In Example 43, the subject matter of Example 42 optionally includes generating the first location parity key after the storage controller receives the write request.

In Example 44, the subject matter of any one or more of Examples 42-43 optionally includes generating the master parity key based at least in part on a data unit encryption key for encrypting the data unit and a value generated by a random number generator.

In Example 45, the subject matter of any one or more of Examples 40-44 optionally includes wherein encrypting the first set of parity bits comprises: encrypting a block of an encrypted data unit based at least in part on the first location parity key to generate a ciphertext; truncating the ciphertext to generate a truncated ciphertext; and masking the first set of parity bits with the truncated ciphertext to generate the first encrypted set of parity bits.

In Example 46, the subject matter of any one or more of Examples 40-45 optionally includes wherein the data storage device comprises a memory device, and wherein the first set of parity bits comprises a set of Error Correction Code (ECC) bits.

Example 47 is at least one computer readable medium comprising instructions to perform the method of any of Examples 40-46.

Example 48 is a data storage apparatus comprising means for performing the method of any of Examples 40-46.

Example 49 is a data storage apparatus, comprising: means for receiving a write request directed to a data storage device, wherein the write request comprises address data indicating a first address and an indication of a data unit; means for encrypting a first set of parity bits corresponding to the data unit basted at least in part on a first location parity key for the first address.

In Example 50, the subject matter of Example 49 optionally includes means for encrypting the data unit based at least in part on a data unit encryption key.

In Example 51, the subject matter of any one or more of Examples 49-50 optionally includes means for generating a master parity key; and means for generating the first location parity key for the first storage location based at least in part on the master parity key and the first address.

In Example 52, the subject matter of Example 51 optionally includes means for generating the first location parity key after receiving the write request.

In Example 53, the subject matter of any one or more of Examples 51-52 optionally includes means for generating the master parity key based at least in part on a data unit encryption key for encrypting the data unit and a value generated by a random number generator.

In Example 54, the subject matter of any one or more of Examples 49-53 optionally includes wherein encrypting the first set of parity bits comprises: encrypting a block of an encrypted data unit based at least in part on the first location parity key to generate a ciphertext; truncating the ciphertext to generate a truncated ciphertext; and masking the first set of parity bits with the truncated ciphertext to generate the first encrypted set of parity bits.

In Example 55, the subject matter of any one or more of Examples 49-54 optionally includes wherein the data storage device comprises a memory device, and wherein the first set of parity bits comprises a set of Error Correction Code (ECC) bits.

Example 56 is a system configured to perform operations of any one or more of Examples 1-55.

Example 57 is a method for performing operations of any one or more of Examples 1-55.

Example 58 is a machine readable medium including instructions that, when executed by a machine, cause the machine to perform the operations of any one or more of Examples 1-55.

Example 59 is a system comprising means for performing the operations of any one or more of Examples 1-55.

The above detailed description includes references to the accompanying drawings, which form a part of the detailed description. The drawings show, by way of illustration, specific examples that may be practiced. These examples are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other examples may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as examples may feature a subset of said features. Further, examples may include fewer features than those disclosed in a particular example. Thus, the following claims are hereby incorporated into the Detailed Description, with a claim standing on its own as a separate example. The scope of the examples disclosed herein is to be determined with reference to the appended claims, along with the full scope of equivalents to which such claims are entitled.

What is claimed is:

1. A data storage system with encryption support comprising:
    a data storage device comprising a plurality of storage locations, the plurality of storage locations comprising a first storage location associated with a first address;
    a storage controller to receive a read request directed to the data storage device, wherein the read request comprises address data indicating the first address;
    wherein the storage controller is to request from the data storage device a first encrypted data unit stored at the first storage location and a first encrypted set of parity bits associated with the first storage location; and
    an encryption system to decrypt the first encrypted set of parity bits to generate a first set of parity bits based at least in part on a first location parity key for the first address, the decrypting comprising:
        encrypting a block of the first encrypted data unit using the first location parity key, the encrypting to generate a ciphertext;
        truncating the ciphertext to generate a truncated ciphertext; and
        masking the first encrypted set of parity bits with the truncated ciphertext, the masking to generate the first set of parity bits.

2. The data storage system of claim 1:
    wherein the encryption system is to generate a master parity key; and
    wherein the encryption system is to generate the first location parity key for the first storage location based at least in part on the master parity key and the first address.

3. The data storage system of claim 2, wherein the encryption system is to generate the first location parity key after the storage controller receives the read request.

4. The data storage system of claim 2, wherein the encryption system is to generate the master parity key based at least in part on a data unit encryption key for decrypting the first encrypted data unit and a value generated by a random number generator.

5. The data storage system of claim 1:
    wherein the storage controller is also to receive a write request directed to a second storage location of the data storage device associated with a second address, wherein the write request comprises a second data unit and second address data indicating the second address; and
    wherein the encryption system is to encrypt a second set of parity bits for the second data unit based at least in part on a second location parity key for the second address.

6. The data storage system of claim 5:
    wherein the encryption system is to generate a master parity key; and
    wherein the encryption system is to generate the second location parity key based at least in part on the master parity key and the second address.

7. The data storage system of claim 5, wherein the encryption system is to encrypt the second set of parity bits by performing operations comprising:
    encrypting a block of a second encrypted data unit based at least in part on the second location parity key to generate a ciphertext;
    truncating the ciphertext to generate a truncated ciphertext; and
    masking the second set of parity bits with the truncated ciphertext to generate an encrypted second set of parity bits.

8. The data storage system of claim 1, wherein the data storage device comprises a memory device, and wherein the first set of parity bits comprises a set of Error Correction Code (ECC) bits.

9. A method for securing a data storage device, comprising:
    receiving, by a storage controller, a read request directed to a data storage device, wherein the read request comprises address data indicating a first address of a first storage location at the data storage device;
    requesting, by the storage controller, from the data storage device a first encrypted data unit stored at the first storage location and a first encrypted set of parity bits associated with the first storage location; and
    decrypting, by an encryption system, the first encrypted set of parity bits to generate a first set of parity bits based at least in part on a first location parity key for the first address, the decrypting comprising:
encrypting a block of the first encrypted data unit using the first location parity key, the encrypting to generate a ciphertext;
truncating the ciphertext to generate a truncated ciphertext; and
masking the first encrypted set of parity bits with the truncated ciphertext, the masking to generate the first set of parity bits.

10. The method of claim 9, further comprising decrypting the first encrypted data unit based at least in part on a data unit encryption key.

11. The method of claim 9, further comprising:
generating a master parity key; and
generating the first location parity key for the first storage location based at least in part on the master parity key and the first address.

12. The method of claim 11, further comprising generating the first location parity key after the storage controller receives the read request.

13. The method of claim 11, further comprising generating the master parity key based at least in part on a data unit encryption key for decrypting the first encrypted data unit and a value generated by a random number generator.

14. The method of claim 9, further comprising:
receiving a write request directed to a second storage location of the data storage device associated with a second address, wherein the write request comprises a second data unit and second address data indicating the second address; and
encrypting a second set of parity bits for the second data unit based at least in part on a second location parity key for the second address.

15. The method of claim 14, further comprising:
generating a master parity key; and
generating the second location parity key based at least in part on the master parity key and the second address.

16. The method of claim 14, wherein encrypting the second set of parity bits comprises:
encrypting a block of a second encrypted data unit based at least in part on the second location parity key to generate a ciphertext;
truncating the ciphertext to generate a truncated ciphertext; and
masking the second set of parity bits with the truncated ciphertext to generate an encrypted second set of parity bits.

17. At least one non-transitory computer readable medium comprising instructions thereon that, when executed by at least one processor, cause the at least one processor to perform operations comprising:
receiving a read request directed to a data storage device, wherein the read request comprises address data indicating a first address of a first storage location at the data storage device;
requesting from the data storage device a first encrypted data unit stored at the first storage location and a first encrypted set of parity bits associated with the first storage location; and
decrypting the first encrypted set of parity bits to generate a first set of parity bits based at least in part on a first location parity key for the first address, the decrypting comprising:
encrypting a block of the first encrypted data unit using the first location parity key, the encrypting to generate a ciphertext;
truncating the ciphertext to generate a truncated ciphertext; and
masking the first encrypted set of parity bits with the truncated ciphertext, the masking to generate the first set of parity bits.

18. The at least one non-transitory computer readable medium of claim 17, the operations further comprising:
generating a master parity key; and
generating the first location parity key for the first storage location based at least in part on the master parity key and the first address.

19. The at least one non-transitory computer readable medium of claim 18, the operations further comprising generating the first location parity key after the read request is received.

20. The at least one non-transitory computer readable medium of claim 18, the operations further comprising generating the master parity key based at least in part on a data unit encryption key for decrypting the first encrypted data unit and a value generated by a random number generator.

* * * * *